United States Patent
Hoffmann et al.

(10) Patent No.: US 8,120,194 B2
(45) Date of Patent: Feb. 21, 2012

(54) SYSTEM, DEVICE, AND METHOD FOR WIND TURBINE LOAD REDUCTION IN A COLD WEATHER ENVIRONMENT

(75) Inventors: Till Hoffmann, Salzbergen (DE); Julian Quindt, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/718,414

(22) Filed: Mar. 5, 2010

(65) Prior Publication Data

US 2011/0133457 A1   Jun. 9, 2011

(51) Int. Cl.
  *F03D 9/00* (2006.01)
  *H02P 9/04* (2006.01)
(52) U.S. Cl. .......................... 290/44; 415/35
(58) Field of Classification Search .............. 290/43, 290/44, 54, 55; 416/1, 35; 415/35
See application file for complete search history.

(56) References Cited

U.S. PATENT DOCUMENTS

| | | | | |
|---|---|---|---|---|
| 4,464,579 A * | 8/1984 | Schwarz | | 290/44 |
| 4,525,633 A * | 6/1985 | Wertheim et al. | | 290/44 |
| 4,651,017 A * | 3/1987 | Longrigg | | 290/44 |
| 6,320,272 B1 * | 11/2001 | Lading et al. | | 290/44 |
| 6,608,397 B2 * | 8/2003 | Makino et al. | | 290/44 |
| 6,809,431 B1 | 10/2004 | Schippmann | | |
| 6,864,594 B2 * | 3/2005 | Seki | | 290/44 |
| 6,909,198 B2 * | 6/2005 | Ragwitz et al. | | 290/44 |
| 6,946,751 B2 * | 9/2005 | Yoshida et al. | | 290/44 |
| 7,023,105 B2 | 4/2006 | Wobben | | |
| 7,560,823 B2 * | 7/2009 | Schellings | | 290/44 |
| 7,880,320 B2 * | 2/2011 | Cook | | 290/44 |
| 7,883,317 B2 * | 2/2011 | Ormel et al. | | 416/1 |
| 7,884,492 B2 * | 2/2011 | Xiong et al. | | 290/55 |
| 2008/0195255 A1 | 8/2008 | Lutze et al. | | |
| 2010/0140938 A1 | 6/2010 | Cook | | |

FOREIGN PATENT DOCUMENTS

EP 1918581 A2 5/2008

OTHER PUBLICATIONS

United States Patent and Trademark Office, Notice of Allowance and Fee(s) Due for U.S. Appl. No. 12/609,237, Sep. 24, 2010, 11 pages, US.
Todd J. Schram, Energy Production Potential of Wind Resources in Texas, Dec. 4, 1998, 19 pgs., US.
Elisabeth Rareshide et al., "Podium presentation at the AWEA Windpower Conference," Effects of Complex Wind Regimes on Turbine Performance, May 2009, 15 pgs., Chicago, US.

(Continued)

*Primary Examiner* — Nicholas Ponomarenko
(74) *Attorney, Agent, or Firm* — James McGinness, Esq.; Armstrong Teasdale LLP

(57) ABSTRACT

A method for controlling an operation of a wind turbine. A meteorological condition is received from a meteorological sensor. An operating threshold value is calculated at least in part by applying a continuous function to the meteorological condition. An operation of the wind turbine is controlled based at least in part on the calculated operating threshold value. For example, the wind turbine may be disabled if a current wind speed exceeds a maximum wind speed that is calculated based on an ambient air temperature or ambient air density.

20 Claims, 5 Drawing Sheets

OTHER PUBLICATIONS

E. Kavak Akpinar et al., "An Assessment on Seasonal Analysis of Wind Energy Characteristics and Wind Turbine Characteristics," Energy Conversion and Management, 2005, pp. 1848-1867, vol. 46, Elsevier.

D. Weisser et al., "Implications of Seasonal and Diurnal Variations of Wind Velocity for Power Output Estimation of a Turbine: A Case Study of Grenada," International Journal of Energy Research, 2003, pp. 1165-1179, vol. 27, New York.

* cited by examiner

SYSTEM, DEVICE, AND METHOD FOR WIND TURBINE LOAD REDUCTION IN A COLD WEATHER ENVIRONMENT

BACKGROUND OF THE INVENTION

The subject matter described herein relates generally to operating a wind turbine and, more particularly, to reducing a structural load on a wind turbine in a cold weather environment.

A wind turbine site includes one or more wind turbines, which utilize wind energy to generate or produce electrical power. Known wind turbines include a control system for operating a wind turbine in a safe and efficient manner. Control parameters, such as operating threshold values, are used to define the behavior of the wind turbine. For example, a controller of a wind turbine may disable the wind turbine if the current wind speed exceeds a maximum wind speed threshold value.

Disabling a wind turbine eliminates all power production from the wind turbine until the wind turbine is reactivated. Efficient operation of a wind farm requires maximizing the amount of time wind turbines operate in safe conditions while avoiding operating wind turbines in potentially damaging conditions such as excessive wind speed, which may induce hazardous structural loads. However, due to variation in factors affecting structural loads (e.g., ambient air density) between warm operating environments and cold operating environments, defining a single operating threshold value that is appropriate for all operating conditions can be difficult.

BRIEF DESCRIPTION OF THE INVENTION

In one aspect, a system for controlling an operation of a wind turbine is provided. The system includes a meteorological sensor and a wind turbine controller. The meteorological sensor is configured to transmit a meteorological condition signal indicating a meteorological condition. The wind turbine controller is configured to determine a calculated operating threshold value that is based at least in part on a continuous function and the meteorological condition. The wind turbine controller is also configured to control an operation of the wind turbine based at least in part on the calculated operating threshold value.

In another aspect, a device is provided for controlling an operation of a wind turbine. The device includes a memory area configured to store at least one meteorological parameter representing a meteorological condition. The device also includes a processor coupled to the memory area and programmed to calculate an operating threshold value at least in part by applying a continuous function to the meteorological parameter. The device further includes a wind turbine control interface configured to control an operation of a wind turbine based at least in part on the calculated operating threshold value.

In yet another aspect, a method for controlling a wind turbine is provided. The method includes receiving, from a first sensor, a meteorological condition signal indicating a meteorological condition. An operating threshold value is calculated by a processor, at least in part by applying a continuous function to the meteorological condition. An operating parameter is created based on a wind turbine condition indicated by a wind turbine condition signal received from a second sensor. The wind turbine condition is representative of a structural load on the wind turbine. An operation of the wind turbine is adjusted when the operating parameter exceeds the calculated operating threshold value.

DETAILED DESCRIPTION OF THE INVENTION

Figure 1:
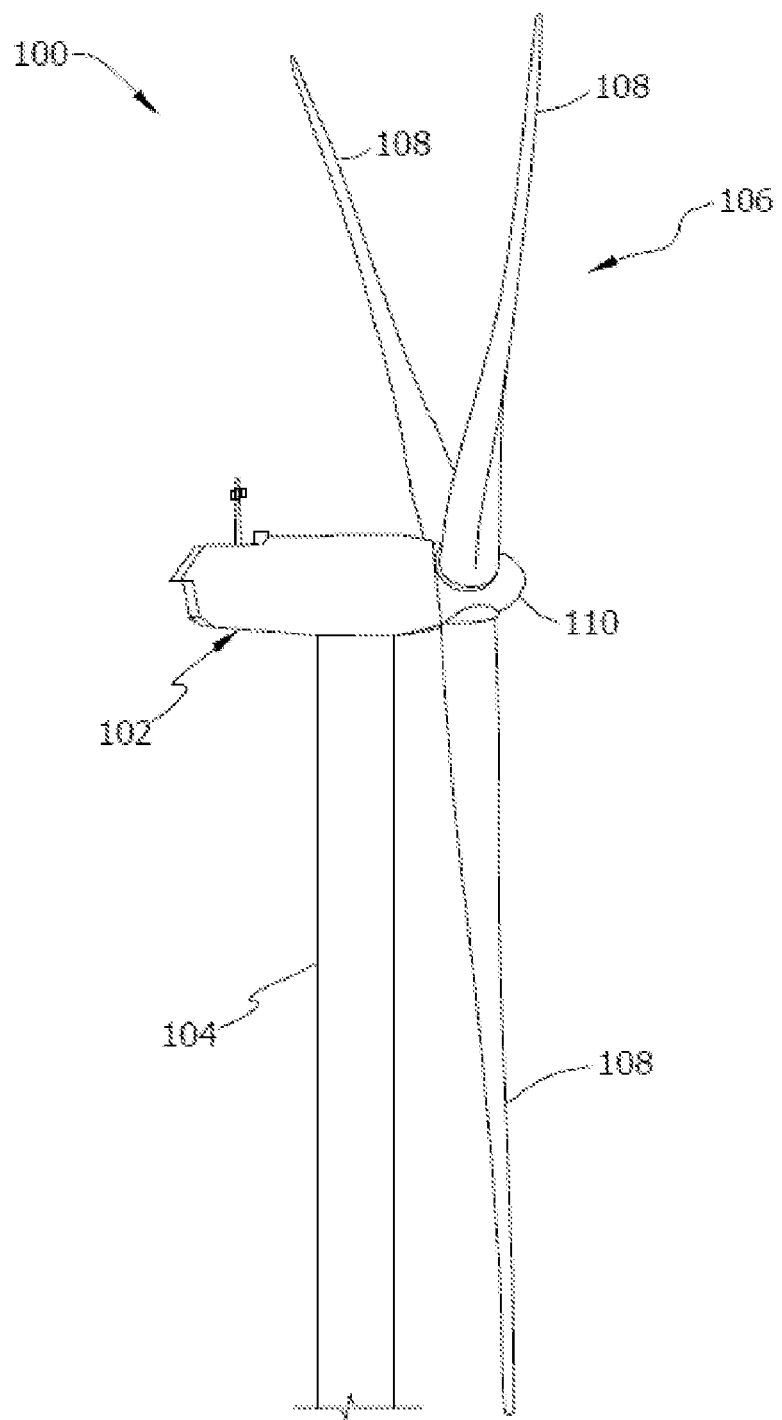
FIG. 1 is a perspective view of an exemplary wind turbine.

The embodiments described herein facilitate operating one or more wind turbines (e.g., in a wind turbine site) using an operating threshold value that varies continuously with a meteorological condition, such as air temperature, air pressure, and/or air density. An operating threshold value may include, without limitation, an operating wind speed threshold value (also known as a maximum operating wind speed). In one embodiment, a maximum operating wind speed is calculated by applying a continuous function to an ambient air temperature and/or an ambient air density. A wind turbine is disabled when a current wind speed exceeds the calculated maximum operating wind speed. Such embodiments facilitate maximizing power production of a wind turbine while avoiding exposing the wind turbine to potentially damaging structural loads.

As described herein, a wind turbine may be controlled based on one or more operating parameters. An operating parameter indicates and/or represents a condition of a wind turbine. Wind turbine conditions include, without limitation, operational conditions (e.g., a rotor speed and/or a power output) and meteorological conditions. A meteorological condition may include, for example, an ambient air temperature, an ambient air density, a humidity level, an air pressure, a wind speed, and/or a wind direction. Some wind turbine conditions may indicate and/or represent, directly or indirectly, a structural load on a wind turbine. For example, a structural load may be indirectly represented by a wind speed, a rotor speed, and/or a power output, though the use of any wind turbine condition representing an environmental element and/or a structural load is contemplated.

Wind turbine conditions may be encoded in or otherwise conveyed by electronic signals. In some embodiments, a sensor transmits a signal that conveys a wind turbine condition. A device receiving the signal from the sensor may be configured to derive or extract the wind turbine condition from the signal.

In some embodiments, a control parameter, such as an operating threshold value, is used to control a wind turbine. An operating threshold value may include, without limitation, a maximum operating wind speed or a maximum rotor speed. For example, if a maximum operating wind speed is defined, the current wind speed may be continuously or periodically monitored. If the current wind speed exceeds the maximum operating wind speed, the wind turbine is disabled to prevent or limit damage to the wind turbine.

An exemplary technical effect of the methods, system, and apparatus described herein includes at least one of: (a) receiving, from a first sensor, a meteorological condition signal indicating a meteorological condition; (b) calculating, by a processor, an operating threshold value at least in part by applying a continuous function to the meteorological condition; (c) creating an operating parameter based on a wind turbine condition that is indicated by a wind turbine condition signal received from a second sensor and representative of a structural load on the wind turbine; and, (d) adjusting an operation of the wind turbine when the operating parameter exceeds the calculated operating threshold value.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In the exemplary embodiment, wind turbine 100 also includes a rotor 106 that includes three rotor blades 108 coupled to a rotating hub 110. Alternatively, wind turbine 100 may include any number of rotor blades 108 that enables operation of wind turbine 100 as described herein. In the exemplary embodiment, wind turbine 100 includes a gearbox (not shown) that is rotatably coupled to rotor 106 and to the generator. Wind turbine 100 may include one or more control devices 120 and/or sensors 125 (shown in FIG. 2).

Figure 2:
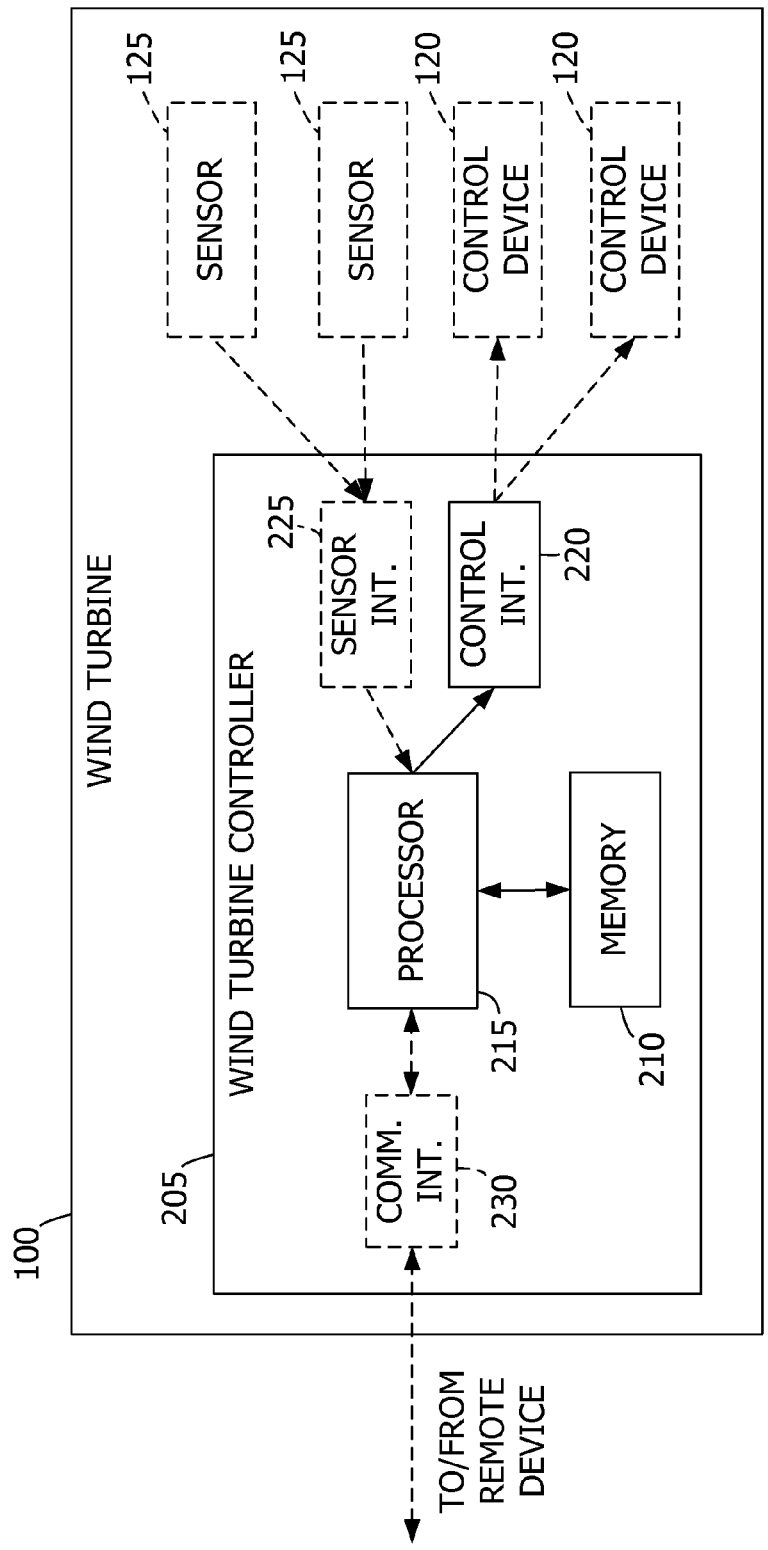
FIG. 2 is a block diagram showing an exemplary wind turbine controller.

FIG. 2 is a block diagram showing an exemplary wind turbine controller 205 for controlling operation of wind turbine 100 (shown in FIG. 1). Wind turbine controller 205 is positioned within wind turbine 100. For example, wind turbine controller 205 may be positioned on or within nacelle 102 or on or within tower 104.

Wind turbine controller 205 includes a memory area 210 configured to store executable instructions and/or one or more meteorological parameters representing and/or indicating a meteorological condition. Meteorological parameters may represent and/or indicate, without limitation, an ambient air temperature, an ambient air density, a humidity level, an air pressure, a wind speed, and/or a wind direction. Memory area 210 may be further configured to store a continuous function defining an operating threshold value based on one or more meteorological conditions, optionally in the form of one or more executable instructions.

Wind turbine controller 205 also includes a processor 215 coupled to memory area 210 and programmed to calculate an operating threshold value at least in part by applying a continuous function to the one or more meteorological parameters. For example, processor 215 may be programmed to calculate an operating wind speed threshold value, which may also be referred to as a maximum operating wind speed. In one embodiment, processor 215 is programmed to calculate the operating wind speed threshold value at least in part by applying the continuous function to one or more operating parameters indicating an ambient air temperature and/or an ambient air density. In an alternative embodiment, instead of calculating the operating wind speed threshold value, wind turbine controller 205 is configured to receive the calculated operating wind speed threshold value from a remote device, as described below in reference to FIG. 4.

Figure 3:
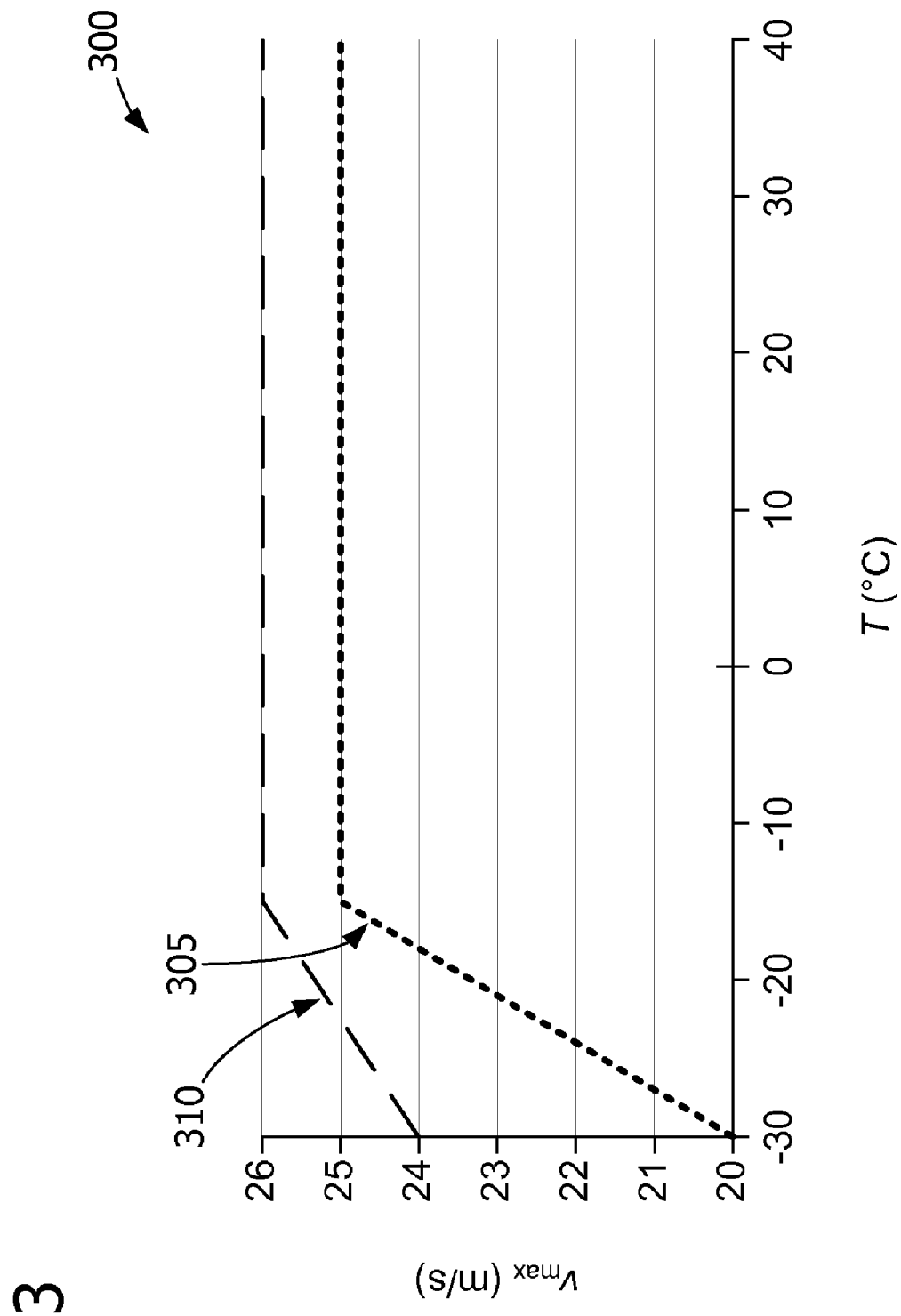
FIG. 3 is a graph plotting exemplary continuous functions for determining a maximum operating wind speed based on an ambient air temperature.

FIG. 3 is a graph 300 plotting exemplary continuous functions for determining a maximum operating wind speed $v_{max}$ based on an ambient air temperature T. Graph 300 includes a first line 305 plotting $v_{max}$ in relation to T according to Equation 1. Equation 1 is an exemplary continuous function for determining $v_{max}$ (in meters per second, m/s) based on T (in degrees Celsius, °C.).

$$v_{max} = \max\left(0, \min\left(25, \frac{1}{3}T + 30\right)\right) \quad \text{(Eq. 1)}$$

Equation 1 limits $v_{max}$ to a minimum of 0 m/s (lower bound) and a maximum of 25 m/s (upper bound). Between the lower and upper bounds, $v_{max}$ is defined as (⅓)T+30.

Graph 300 also includes a second line 310 plotting $v_{max}$ in relation to T according to Equation 2. Equation 2 is another exemplary continuous function for determining $v_{max}$ based on T.

$$v_{max} = \max\left(0, \min\left(26, \frac{2}{15}T + 28\right)\right) \quad \text{(Eq. 2)}$$

Between a lower bound of 0 m/s and an upper bound of 26 m/s, Equation 2 defines $v_{max}$ as (2/15)T+28. Although first line 305 and second line 310 depict particular linear continuous functions, any linear or non-linear continuous function suitable for operating wind turbine 100 may be used to calculate an operating threshold value.

Referring again to FIG. 2, wind turbine controller 205 also includes a wind turbine control interface 220 configured to control an operation of a wind turbine based at least in part on the calculated operating threshold value. In some embodiments, wind turbine control interface 220 is configured to be operatively coupled to one or more wind turbine control devices 120. Wind turbine control device 120 includes, without limitation, a blade pitch adjustment apparatus and/or a rotor brake.

In some embodiments, wind turbine 100 includes one or more sensors 125. Sensors 125 sense or detect one or more wind turbine conditions. For example, sensor 125 may be an accelerometer, a vibration sensor (e.g., indicating mechanical vibration of one or more components of wind turbine 100), a power output sensor, a blade pitch sensor, a rotor speed sensor, a gear ratio sensor, a torque sensor, a turbine temperature sensor, a gearbox temperature sensor, a voltage sensor, a current sensor, and/or a meteorological sensor. Meteorological sensors include, without limitation, an ambient air temperature sensor, a wind speed and/or wind direction sensor (e.g., an anemometer), an ambient air density sensor, an atmospheric pressure sensor, a humidity sensor, and/or any sensor suitable for providing a signal indicating a meteorological condition.

Each sensor 125 is located with respect to wind turbine 100 according to its function. For example, an air temperature sensor may be positioned on an outside surface of nacelle 102 or tower 104, such that the air temperature sensor is exposed to ambient air surrounding wind turbine 100. Each sensor 125 generates and transmits a signal corresponding to the one or more detected conditions. Moreover, each sensor 125 may transmit a signal continuously, periodically, or only once, for example, though other signal timings are also contemplated. Furthermore, each sensor 125 may transmit a signal either in an analog form or in a digital form.

In one embodiment, wind turbine controller 205 receives one or more signals from sensor 125 via a sensor interface 225, which is configured to be coupled in communication with sensor 125. Wind turbine controller 205 processes the signal(s) by processor 215 to create one or more operating parameters, including, without limitation, meteorological parameters. In some embodiments, processor 215 is programmed (e.g., with executable instructions in memory area 210) to sample a signal produced by sensor 125. For example, processor 215 may receive a continuous signal from sensor 125 and, in response, produce an operating condition value based on the continuous signal periodically (e.g., once every five seconds). In some embodiments, processor 215 normalizes a signal received from sensor 125. For example, a temperature sensor may produce an analog signal with a parameter (e.g., voltage) that is directly proportional to a measured temperature. Processor 215 may be programmed to convert the analog signal to a temperature value.

In an exemplary embodiment, sensor interface 225 is configured to receive a wind turbine condition signal from sensor 125. The wind turbine condition signal indicates, directly or indirectly, a structural load on the wind turbine. For example, the wind turbine condition signal may be a wind speed signal that indicates a current wind speed. Wind turbine control interface 220 may be configured to control an operation of wind turbine 100 based on the wind turbine condition signal and the calculated operating threshold value. In one embodiment, wind turbine control interface 220 is configured to disable wind turbine 100 when the current wind speed exceeds an operating wind speed threshold value. For example, wind turbine control interface 220 may disable wind turbine 100 by applying a brake to rotor 106, by adjusting a pitch angle of rotor blades 108, and/or by any other means suitable for reducing the structural load applied to wind turbine 100.

Processor 215 may be programmed to create an operating parameter based on signals received from multiple sensors 125. For example, wind turbine 100 may include multiple air temperature sensors, and processor 215 may calculate an average air temperature based on temperature values from each air temperature sensor. In some embodiments, controller 205 stores one or more signals and/or operating condition values in memory area 210.

In some embodiments, wind turbine controller 205 includes a communication interface 230. Communication interface 230 is configured to be coupled in communication with one or more remote devices, such as another wind turbine controller 205 and/or a site controller 410 (shown in FIG. 4). Communication interface 230 may be configured to transmit a wind turbine condition, an operating parameter, and/or a control parameter (e.g., a calculated operating threshold value) to a remote device. For example, communication interface 230 may be configured to encode a wind turbine condition, an operating parameter, and/or a control parameter in a signal. In addition, or alternatively, communication interface 230 may be configured to receive an operating parameter (e.g., an ambient air temperature) and/or a control parameter (e.g., a calculated operating threshold value) from a remote device and control an operation of wind turbine 100 based at least in part on the received operating parameter and/or control parameter.

Various connections are available between wind turbine control interface 220 and wind turbine control device 120 and between sensor interface 225 and sensor 125. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 100) network connection, whether wired or wireless.

Figure 4:
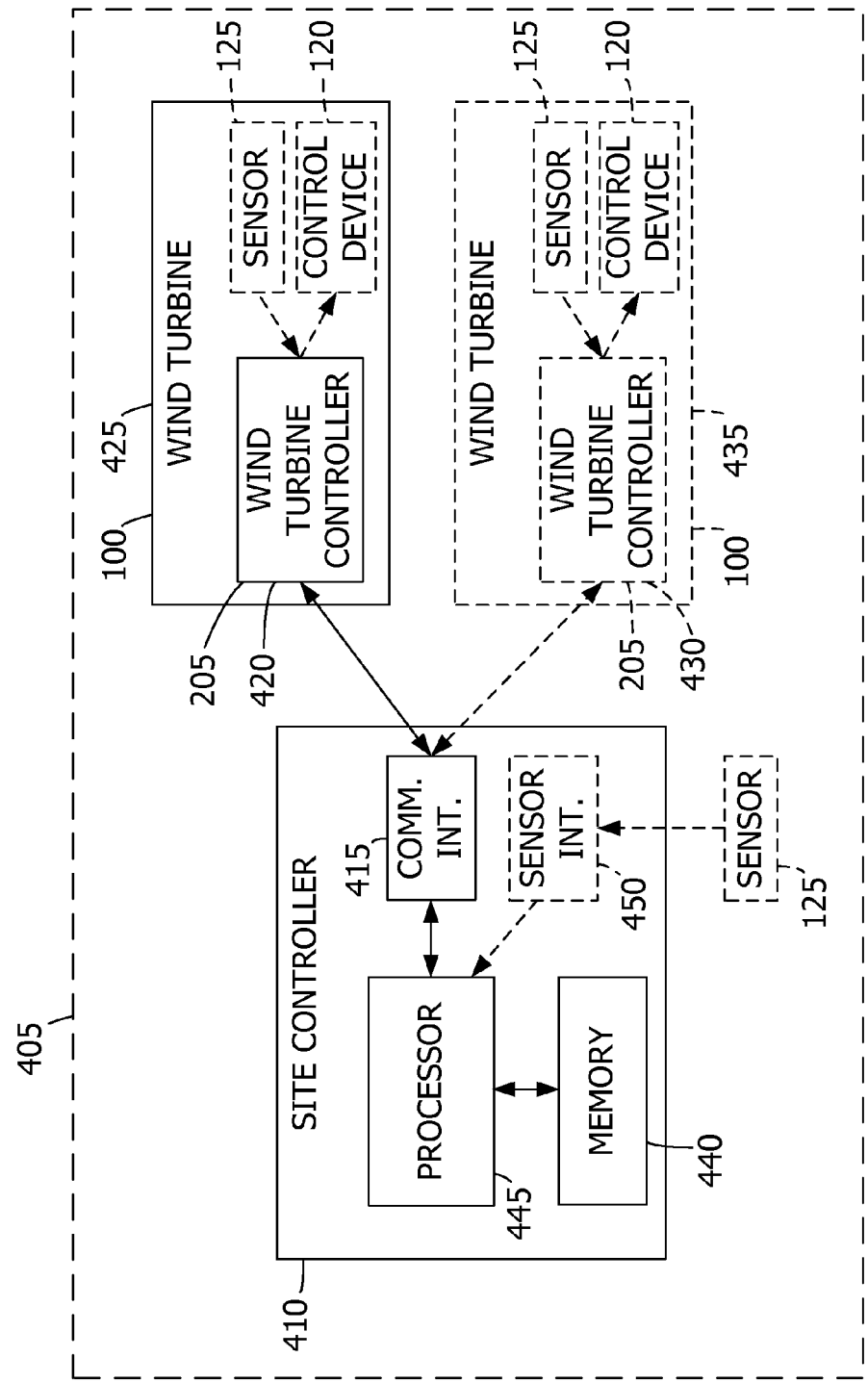
FIG. 4 is a block diagram showing an exemplary system for operating one or more wind turbines, as shown in FIG. 1.

FIG. 4 is a block diagram showing an exemplary system 400 for controlling an operation of one or more wind turbines 100 in a wind turbine site 405. System 400 includes a site controller 410 that is coupled in communication with one or more wind turbine controllers 205 via a communication interface 415. For example, communication interface 415 may be configured to transmit and/or receive a signal in which a wind turbine condition, an operating parameter, and/or a control parameter is encoded.

As shown in FIG. 4, site controller 410 is located within wind turbine site 405. However, site controller 410 may be positioned at a location remote to wind turbine site 405, such as a centralized monitoring and/or control facility. Furthermore, site controller 410 may be coupled in communication with wind turbine controllers 205 at multiple wind turbine sites 405.

Site controller 410 is coupled in communication with a first wind turbine controller 420 of a first wind turbine 425 and a second wind turbine controller 430 of a second wind turbine 435 by communication interface 415. First wind turbine controller 420 and second wind turbine controller 430 are instances of wind turbine controller 205. First wind turbine 425 and second wind turbine 435 are instances of wind turbine 100. Site controller 410 may be coupled in communication with any number of wind turbine controllers 205.

Site controller 410 includes a memory area 440 configured to store operating data and/or executable instructions for execution by a processor 445. For example, operating data may include data describing wind turbines 100, wind turbine controllers 205, and/or wind turbine conditions (e.g., meteorological conditions). Memory area 440 may be further configured to store a continuous function defining an operating threshold value based on one or more meteorological conditions, optionally in the form of one or more executable instructions.

Site controller 410 is configured to receive, via communication interface 415, a meteorological parameter, such as an ambient air temperature and/or an ambient air density, from first wind turbine controller 420 and/or second wind turbine controller 430. In addition, or alternatively, site controller 410 may include a sensor interface 450 configured to be coupled in communication with one or more sensors 125. In such an embodiment, site controller 410 may be configured to receive a meteorological condition signal from sensor 125 and to create a meteorological parameter based on a meteorological condition indicated by the meteorological condition signal.

Site controller 410 is also configured to transmit, to first wind turbine controller 420 and/or second wind turbine controller 430, a meteorological parameter and/or a calculated operating threshold value. In one embodiment, site controller 410 is configured to receive a single meteorological parameter from first wind turbine controller 420 or second wind turbine controller 430, or to create a single meteorological parameter based on a meteorological condition indicated by a meteorological condition signal from sensor 125. Site controller 410 is further configured to transmit the single meteorological parameter to first wind turbine controller 420 and/or second wind turbine controller 430, which are configured to calculate an operating threshold value based on the single meteorological parameter. Such an embodiment facilitates meteorology-based control of wind turbines 100 even when one or more of wind turbines 100 does not include an operable meteorological sensor. Furthermore, such an embodiment facilitates calculating an operating threshold value that is specific to a wind turbine 100. For example, at a given ambient air temperature and/or a given ambient air density, a different maximum operating wind speed may be appropriate for first wind turbine 425 than is appropriate for second wind turbine 435.

In another embodiment, site controller 410 is configured to receive and/or create a plurality of meteorological parameters from first wind turbine controller 420, second wind turbine controller 430, and/or sensor 125. Site controller 410 is also configured to create a calculated meteorological parameter based on the plurality of meteorological parameters. For example, processor 445 may be programmed to calculate an average (e.g., a mean or a median) meteorological parameter from the plurality of meteorological parameters. Site controller 410 is further configured to transmit the calculated meteorological parameter to first wind turbine controller 420 and/or second wind turbine controller 430, which are configured to calculate an operating threshold value based on the calculated meteorological parameter.

In yet another embodiment, site controller 410 is configured to receive and/or create one or more meteorological parameters from first wind turbine controller 420, second wind turbine controller 430, and/or sensor 125. Site controller 410 is also configured to calculate an operating threshold value (e.g., a maximum operating wind speed) at least in part by applying a continuous function to the meteorological parameter(s). If multiple meteorological parameters are available, site controller 410 may be configured to calculate an average (e.g., mean or median) meteorological parameter and apply the continuous function to the average meteorological parameter. Alternatively, site controller 410 may be configured to apply the continuous function to each meteorological parameter to create a plurality of operating threshold values and then calculate an average (e.g., mean or median) operating threshold value. Site controller 410 is further configured to transmit the calculated operating threshold value to first wind turbine controller 420 and/or second wind turbine controller 430. First wind turbine controller 420 and/or second wind turbine controller 430 are configured to control an operation of corresponding wind turbine 100 based at least in part on the calculated operating threshold value. In such an embodiment, communication interface 415 may be considered a wind turbine control interface.

Some embodiments facilitate calculating a moving average for an operating parameter. In one embodiment, site controller 410 and/or wind turbine controller 205 is configured to receive and/or create a plurality of operating parameters based on a plurality of wind turbine conditions indicated by recent wind turbine condition signals. For example, the operating parameters may correspond to a quantity of recently produced wind turbine condition signals (e.g., the five most recent wind turbine condition signals) and/or may correspond to wind turbine condition signals received within a recent duration (e.g., wind turbine condition signals received in the previous five minutes). Site controller 410 and/or wind turbine controller 205 is configured to calculate an average (e.g., mean or median) operating parameter based on the plurality of operating parameters. An operating threshold value may be calculated based on the average operating parameter.

Communication between devices such as wind turbine controller 205 and site controller 410 may occur in a variety of forms. For example, communication interfaces 230, 415 may use a wired network connection (e.g., Ethernet or an optical fiber), a wireless connection such as radio frequency (RF), BLUETOOTH, an IEEE 802.11 standard (e.g., 802.11 (g) or 802.11(n)), Worldwide Interoperability for Microwave Access (WIMAX), or a cellular phone technology (e.g., the Global Standard for Mobile communication (GSM)), and/or any other suitable communication means. Wind turbine controller 205 and/or site controller 410 may include multiple communication interfaces to support additional forms of communication, or multiple forms of communication may be supported by a single communication interface. Devices such as wind turbine controller 205 and site controller 410 may be communicatively coupled directly or indirectly. For example, site controller 410 may communicate with wind turbine controller 205 through a network such as a local area network (LAN), a wide area network (WAN), the Internet, or any other network suitable for communicating with wind turbine controller 205.

Figure 5:
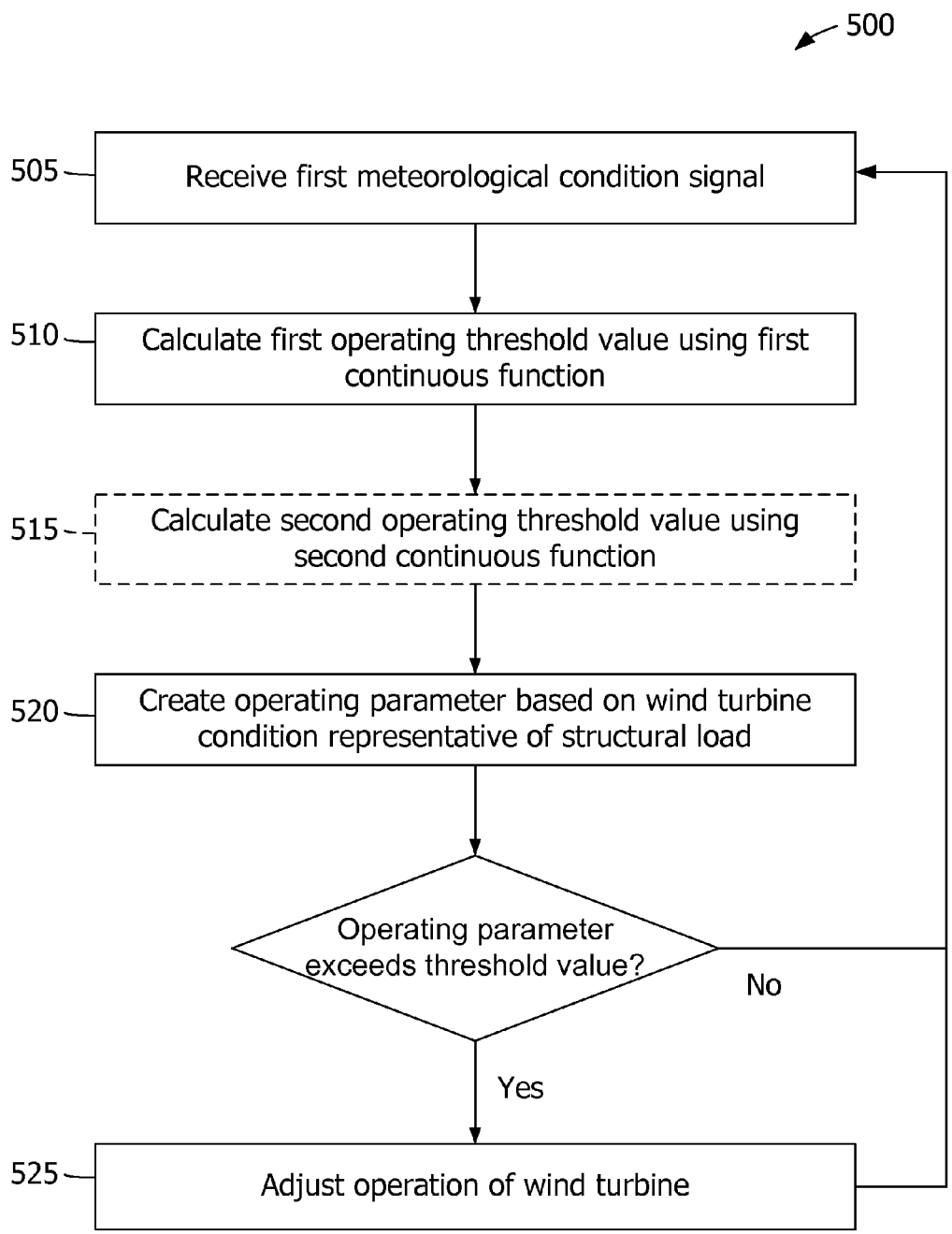
FIG. 5 is a flowchart of an exemplary method for controlling the wind turbine shown in FIG. 1.

FIG. 5 is a flowchart of an exemplary method 500 for controlling a wind turbine, such as wind turbine 100, shown in FIG. 1. Method 500 includes receiving 505, from a first sensor, a first meteorological condition signal indicating a meteorological condition (e.g., an ambient air temperature and/or an ambient air density). A first operating threshold value is calculated 510 by a processor, at least in part by applying a continuous function to the meteorological condition. For example, a continuous function such as Equation 1 or Equation 2 may be applied to the meteorological condition. The operating threshold value may include, without limitation, a maximum operating wind speed, a maximum power output, a maximum torque, and/or a maximum vibration level.

The first operating threshold may be calculated 510 by a first processor of a first wind turbine controller. A second operating threshold may be calculated 515 by a second processor of a second wind turbine controller, at least in part by applying a second continuous function to the meteorological condition.

An operating parameter is created 520 based on a wind turbine condition indicated by a wind turbine condition signal received from a second sensor. The wind turbine condition is representative, directly or indirectly, of a structural load on the wind turbine. For example, the wind turbine condition signal may indicate a current wind speed, a current power output, a current torque, and/or a current vibration level. The operating parameter may be created 520 using a moving average, as described above.

An operation of the wind turbine is adjusted 525 when the operating parameter exceeds the calculated operating threshold value. For example, adjusting 525 an operation of the wind turbine may include disabling the wind turbine, reducing a power output of the wind turbine, applying a brake to a rotor of the wind turbine, and/or adjusting a blade pitch of the wind turbine. As shown in FIG. 5, method 500 may be performed repeatedly (e.g., continuously or periodically).

In some embodiments, an operation of multiple wind turbines is adjusted 525 based at least in part on the calculated operating threshold value and/or the created operating parameter. For example, the operating parameter may be created 520 based on a wind turbine condition corresponding to a first wind turbine, and an operation of a second wind turbine may be adjusted 525 when the operating parameter exceeds the calculated operating threshold value. Such an embodiment facilitates reducing a structural load on the second wind turbine regardless of whether the second wind turbine includes operable sensors.

The methods described herein may be encoded as executable instructions embodied in a computer readable medium, including a memory area of a computing device such as wind turbine controller 205 and/or site controller 410. Such instructions, when executed by a processor, cause the processor to perform at least a portion of the methods described herein.

Exemplary embodiments of a wind turbine control system are described above in detail. The system, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for controlling an operation of a wind turbine, the system comprising:
   a meteorological sensor configured to transmit a meteorological condition signal indicating a meteorological condition; and,
   a wind turbine controller configured to:
      determine a calculated operating threshold value based at least in part on a continuous function and the meteorological condition; and,
      control an operation of the wind turbine based at least in part on the calculated operating threshold value.

2. A system in accordance with claim 1, wherein the meteorological sensor is a first sensor, the system further comprising:
   a second sensor configured to transmit a wind turbine condition signal indicating a wind turbine condition representative of a structural load on the wind turbine,
   wherein the wind turbine controller is further configured to control an operation of the wind turbine based at least in part on the calculated operating threshold value and the wind turbine condition.

3. A system in accordance with claim 2, wherein the second sensor is configured to transmit a wind speed signal indicating a wind speed, and the wind turbine controller is further configured to:
   determine an operating wind speed threshold value based at least in part on a continuous function and the meteorological condition indicated by the meteorological condition signal; and,
   disable the wind turbine when the wind speed is greater than the operating wind speed threshold value.

4. A system in accordance with claim 1, wherein the meteorological sensor is configured to transmit an air temperature signal indicating an ambient air temperature.

5. A system in accordance with claim 1, wherein the wind turbine controller is further configured to calculate the operating threshold value at least in part by applying a continuous function to the meteorological condition.

6. A system in accordance with claim 1, wherein the wind turbine controller is a first wind turbine controller further configured to generate a meteorological parameter based on the meteorological condition signal, the system further comprising:
   a site controller coupled in communication with the first wind turbine controller and a second wind turbine controller, the site controller configured to:
      receive the meteorological parameter from the first wind turbine controller;
      calculate an operating threshold value at least in part by applying a continuous function to the meteorological parameter; and,
      transmit the calculated operating threshold value to the first wind turbine controller and the second wind turbine controller,
   wherein the first wind turbine controller and the second wind turbine controller are configured to control an operation of a corresponding wind turbine based at least in part on the transmitted calculated operating threshold value.

7. A system in accordance with claim 6, wherein the meteorological parameter is a first meteorological parameter, and the site controller is further configured to:
   receive a second meteorological parameter from the second wind turbine controller; and,
   calculate the operating threshold value by further applying the continuous function to the second meteorological parameter.

8. A system in accordance with claim 1, wherein the wind turbine controller is a first wind turbine controller coupled to the meteorological sensor and further configured to transmit a first meteorological parameter based on the meteorological condition indicated by the meteorological condition signal, the system further comprising:
   a site controller coupled in communication with the first wind turbine controller and a second wind turbine controller, the site controller configured to:
      receive the first meteorological parameter from the first wind turbine controller and a second meteorological parameter from the second wind turbine controller;
      create a calculated meteorological parameter based on the first meteorological parameter and the second meteorological parameter; and,
      transmit the calculated meteorological parameter to the first wind turbine controller and the second wind turbine controller,
   wherein the first wind turbine controller and the second wind turbine controller are configured to calculate an operating threshold value by applying a continuous function to the calculated meteorological parameter.

9. A device for controlling an operation of a wind turbine, the device comprising:
   a memory area configured to store at least one meteorological parameter representing a meteorological condition;
   a processor coupled to the memory area and programmed to calculate an operating threshold value at least in part by applying a continuous function to the meteorological parameter; and,
   a wind turbine control interface configured to control an operation of a wind turbine based at least in part on the calculated operating threshold value.

10. A device in accordance with claim 9, wherein the wind turbine control interface comprises a communication interface configured to control the operation of the wind turbine by transmitting the calculated operating threshold value to a wind turbine controller.

11. A device in accordance with claim 9, wherein the wind turbine control interface is configured to be operatively coupled to a wind turbine control device, the wind turbine control device including at least one of a blade pitch adjustment apparatus and a rotor brake.

12. A device in accordance with claim 9, further comprising a sensor interface configured to receive a wind turbine condition signal indicating a structural load on the wind turbine, wherein the wind turbine control interface is further configured to control an operation of the wind turbine based on the wind turbine condition signal.

13. A device in accordance with claim 9, wherein the processor is further programmed to calculate an operating wind speed threshold value at least in part by applying a continuous function to the meteorological parameter indicating an ambient air temperature.

14. A device in accordance with claim 13, further comprising a sensor interface configured to receive a wind speed signal indicating a current wind speed, wherein the wind turbine control interface is further configured to disable the wind turbine when the current wind speed exceeds the operating wind speed threshold value.

15. A method for controlling a wind turbine, the method comprising:
   receiving, from a first sensor, a meteorological condition signal indicating a meteorological condition;
   calculating, by a processor, an operating threshold value at least in part by applying a continuous function to the meteorological condition;
   creating an operating parameter based on a wind turbine condition indicated by a wind turbine condition signal received from a second sensor, the wind turbine condition representative of a structural load on the wind turbine; and,
   adjusting an operation of the wind turbine when the operating parameter exceeds the calculated operating threshold value.

16. A method in accordance with claim 15, wherein receiving the meteorological condition signal comprises receiving at least one of an ambient air temperature signal and an ambient air density signal.

17. A method in accordance with claim 15, wherein calculating the operating threshold value comprises calculating a maximum operating wind speed, and creating an operating parameter based on the wind turbine condition signal comprises calculating a current wind speed.

18. A method in accordance with claim 15, wherein creating the operating parameter based on the wind turbine condition comprises calculating a moving average based on a plurality of wind turbine conditions indicated by a plurality of wind turbine condition signals.

19. A method in accordance with claim 15, further comprising:
   calculating, by a first processor of a first wind turbine controller, a first operating threshold value at least in part by applying a first continuous function to the meteorological condition; and,
   calculating, by a second processor of a second wind turbine controller, a second operating threshold value at least in part by applying a second continuous function to the meteorological condition.

20. A method in accordance with claim 15, wherein adjusting an operation of the wind turbine comprises disabling the wind turbine.

* * * * *